United States Patent [19]

Meyer et al.

[11] 4,120,844

[45] Oct. 17, 1978

[54] MOLDED CALCIUM CARBONATE FILLED PROPYLENE RESIN COMPOSITES

[75] Inventors: Fred J. Meyer, Chelsea; Seymour Newman, Southfield, both of Mich.

[73] Assignee: Ford Motor Company, Dearborn, Mich.

[21] Appl. No.: 775,811

[22] Filed: Mar. 9, 1977

[51] Int. Cl.² ............................................. C08K 3/26
[52] U.S. Cl. .................... 260/42; 260/23 H; 260/42.46
[58] Field of Search ............................ 260/42.46, 42

[56] References Cited

U.S. PATENT DOCUMENTS

| | | | |
|---|---|---|---|
| 3,700,614 | 10/1972 | Schenkerberg | 260/42.46 |
| 3,919,164 | 11/1975 | Hattori | 260/42.46 |
| 3,997,494 | 12/1976 | Lever | 260/42.46 |

*Primary Examiner*—James H. Derrington
*Attorney, Agent, or Firm*—Edmund C. Ross, Jr.; Keith L. Zerschling

[57] ABSTRACT

A method for increasing impact properties of calcium carbonate filled propylene resin composites, particularly impact properties at low temperatures, which comprises admixing critically sized particles of propylene homopolymer and copolymer resins and calcium carbonate filler to form uniform, preferably powdery, blends particularly suitable for such shaping operations as injection molding.

2 Claims, No Drawings

MOLDED CALCIUM CARBONATE FILLED PROPYLENE RESIN COMPOSITES

This invention relates to a discovery that certain critically sized particles of certain propylene resins and calcium carbonate fillers provide calcium carbonate filled propylene resin composites with higher impact strength, especially at low temperatures. Accordingly, this invention relates to these composites and their method of making.

Inorganic filled thermoplastics are known. However, problems occur when modifying thermoplastics with such fillers since filling often leads to undesired tradeoffs in mechanical properties. For example, glass filled thermoplastics exhibit increased rigidity at the expense of impact. Rubber filled thermoplastics, on the other hand, increase impact at the expense of rigidity.

Prior art in making inorganic filled resins with calcium carbonate and propylene resin include the following patents: U.S. Pat. 3,745,142 which discloses dispersions of particles of propylene resin and fillers such as calcium carbonate; U.S. Pat. No. 3,700,614 which discloses use of stearic acid coated calcium carbonate with propylene resin and an elastomeric material; U.S. Pat. No. 3,687,890 which discloses broadly that types of fillers for resins as propylene resins include calcium carbonate; U.S. Pat. No. 3,457,216 which discloses a propylene resin with fillers including calcium carbonate; and U.S. Pat. No. 3,070,557 which discloses thermoplastic polymer-bonded aggregates including "dust-type fillers". Other U.S. patents of interest include U.S. Pat. Nos. 3,085,988; 3,846,523; 3,860,542 and 3,894,985.

This invention provides a method for circumventing normally cancellatory effects of filling propylene resins. More particularly, this invention provides means for providing higher impact properties to calcium carbonate filled propylene resin composites, particularly at low temperatures, without undesirable diminution of other mechanical properties. Remarkably, composites of this invention have properties making them suitable for competition with more costly thermoplastics such as acrylonitrile-butadiene-styrene polymers, commonly known as A.B.S.

Accordingly, it is an object of this invention to provide a method for preparing calcium carbonate filled propylene resin composites with higher impact properties, particularly at low temperatures.

It is another object of this invention to provide such composites with properties that make them suitable for competition with more costly thermoplastic materials.

These and other objects will be apparent from the hereinafter detailed description of this invention.

The method of this invention for improvement of impact properties of calcium carbonate filled propylene resin composites comprises admixing about 1–6 parts by weight of propylene resins which pass through (i.e., about 99% or higher by weight) a 20 mesh screen but are retained (i.e., about 99% or higher by weight) on a 325 mesh screen with calcium carbonate filler which passes through a 60 mesh screen (i.e., about 99% by weight), the calcium carbonate filler having a number average particle diameter of greater than 10 millimicrons, wherein the propylene resins comprise propylene homopolymer and copolymer resins preferably in a weight ratio of about 1:2–2:1. Composites of optimum properties are obtained from uniform or substantially uniform powdery blends of these mixtures.

The propylene resins useful herein include well known, commercially available propylene polymers. The propylene homopolymer resin comprises olefin polymers which are more than 97% polypropylene including additives not copolymerized therewith. The propylene homopolymer resin is largely (e.g., 60%) crystalline or crystallizable and made with stereospecific catalysts.

The propylene copolymer resin herein includes materials with from about 75%–97% by weight propylene with the remainder comprising, for example, ethylene or other olefinic material (e.g., alpha olefins such as 1-butene, 1-hexene, 1-octene or the like). (An example of such propylene copolymer resin, described in greater detail, appears in U.S. Pat. No. 3,576,784 which is herein incorporated by reference.)

Of these propylene resins (homopolymer and copolymer), those which have intrinsic viscosities between about 2.0–2.6 are particularly preferred for processing expedience, but materials with lower or higher intrinsic viscosities (e.g., 2.8) can also be suitably employed.

Preferred propylene homopolymer resins include those materials with such properties as Tensile Strength (ASTM-D638) of about 4500–5500 psi; Flexural Modulus (ASTM-D790) of about 180,000–220,000 psi; Izod Impact (ASTM-D256) of about 0.3–1.5 ft.-lb./in. (notched) and about 10 ft.-lb./in. — NB (unnotched) wherein NB is no clean break at 30 ft.-lb./in.; Gardner drop weight impact of about 10–40 in.-lb. at 72° F. and about 1–10 in.-lb. at −20° F.; and Heat Deflection Temperatures (° F.) (ASTM-D648) at 66 psi of about 200° F.–212° F. and at 264 psi of about 135° F.–145° F.

With respect to the propylene copolymer resin, preferred materials include those with properties such as Tensile Strength (ASTM-D638) of about 2500–4500 psi; Flexural Modulus (ASTM-D790) of about 90,000–180,000 psi; Izod Impact (ASTM-D256) of about 1.5–9 ft.-lb./in. (notched) and about 20 — NB ft.-lb./in., (unnotched) wherein NB is as above; Gardner Drop Weight at 72° F. of about 40 to over 200 in.-lb. and at −20° F. of about 10 to over 120 in.-lb.; and Heat Deflection Temperatures (ASTM-D648) at 66 psi of about 150°–200° F. and at 264 psi of about 115°–135° F.

As above, the propylene resins (homopolymer and copolymer) should be of certain particle size for the higher impact properties of this invention. Larger particle sizes are found to impair impact strength according to this invention.

Further, the calcium carbonate filler should have a particle size such that it passes through a 60 mesh screen (i.e., at least about 99% by weight). Calcium carbonate fillers which also have a particle size such that at least about 80% by weight passes through a 325 mesh screen are preferred. Larger particle sizes are found to impair impact strength. Moreover, smaller sized particle fillers, i.e., those with a number average particle diameter of less than about 10 millimicrons also impair impact strength according to this invention.

Calcium carbonate fillers within these particle size limitations are commercially available. Of mineral forms such as argonite and calcite, calcite is preferred. Dry ground calcium carbonate fillers are preferred not only from an economic standpoint, but also due to their relative absence of moisture.

Maximum impact properties are obtained with the above particle sizes of resin and filler when the weight ratio of calcium carbonate filler to propylene resins (homopolymer and copolymer) is about 7:13–9:11, e.g., concentration of about 35%–45% by weight of the total weight of the composite being calcium carbonate and the remainder comprising propylene resins (homopolymer and copolymer). For example, impact strengths of a filled propylene homopolymer resin as measured by a falling weight test is one half of the amount at 30% by weight calcium carbonate as it is at 40% by weight calcium carbonate.

The calcium carbonate filler particles do not require hydrophobic surface treatment (e.g., stearic acid or the like) prior to admixture with propylene resin, although calcium carbonate filler with such surface treatments may be used.

Although composites formed with propylene homopolymer resin and calcium carbonate filler alone with particle sizes hereinbefore set forth exhibit high impact properties at normal room temperatures, material demands (e.g., matching properties of more costly thermoplastics such as A.B.S.) require high impact values at considerably lower temperatures (e.g., −20° F.). This is accomplished according to this invention by further inclusion of the copolymer resin as previously described.

It is essential to this invention for achievement of optimum properties that the filler and resin particles, as above described, be thoroughly mixed to achieve a uniform or substantially uniform powdery blend prior to fusing the composite. This is accomplished preferably by mixing the dry particles with high intensity mixing to achieve the uniformly mixed powdery blends. While these resultant powdery blends may be injection molded as such, they also may be (and preferably are) extrusion compounded into pellet form. Conventional extrusion equipment such as multi-stage extruders operating at or below a 200° C. melt temperature can be employed. Vacuum venting and post-extrusion drying are normally preferred.

It is to be recognized that other mixing and compounding techniques can be employed such as (1) banbury mixing, a calandering, and dicing; and (2) V-blending and twin screw extrusion to form composites of this invention. It is also to be understood that other additives may be included in the composites of this invention. For example, antioxidants, mold release agents, pigments, flame retardants and the like may be included.

The composites ("composites" as used herein refers to fused calcium carbonate filled propylene resins whether fused during compounding processes or fused during shaping operations) are preferably shaped by such operations as injection molding processes which are well known and conventional in the art. Injection molded composites are advantageously used for automotive parts (e.g., instrument panels) and other such parts wherein economical thermoplastics are desired. Other shaping operations may also be employed such as extrusion, blow molding, vacuum forming and the like.

The following examples are intended to illustrate preferred aspects of this invention and are not intended as limiting thereof. That modification of these examples within the scope of this invention can be accomplished will be understood by those skilled in the art.

EXAMPLE

In this Example, composites are made at varying levels of propylene resins with calcium carbonate filler. The propylene resins have particles with a size falling within the scope of this invention.

Table I lists formulations for these composites and also includes three propylene resin composites for comparison.

The composites are prepared by first admixing the particles of resins and filler followed by high intensity mixing (Henschel Model FM75D) at low speed (about 1,765 rpm) for one minute and by high speed (3,515 rpm) for four minutes to form uniformly mixed powdery blends. With the exception of composite 7, the powdery blends are thereafter extrusion compounded followed by injection molding to form standard ASTM test specimens. Composite 7 is injection molded as a powdery blend of particles after high intensity mixing.

Table II illustrates the results of testing each of the composites made from the formulations set forth in Table I as well as properties of the unfilled resins. As can be seen, particle size is a critically important factor for achievement of high impact strength. Moreover, homopolymer and copolymer resins are required for maximum impact properties at low temperatures.

TABLE I

| Component | Code | #1 | #2 | #3 | #4 | #5 | #6 | #7 | #8 | #9 | #10 |
|---|---|---|---|---|---|---|---|---|---|---|---|
| Polypropylene Resin* | | | | | | | | | | | |
| - homopolymer | | 100 | | | 60 | 60 | 60 | | | | 30 |
| - copolymer - 10% | | | 100 | | | | | 60 | 60 | | |
| - copolymer - 20% | | | | 100 | | | | | | 60 | 30 |
| Calcium Carbonate | | | | | | | | | | | |
| - aragonite | | | | | 40 | | | | | | |
| - calcite | | | | | | | | | | | |
| - passes 100–40 mesh but does not pass 60 mesh | | | | | | 40 | | | | | |
| - passes 60 mesh** | | | | | | | 40 | 40 | 40 | 40 | 40 |
| Compounding Technique | | | | | | | | | | | |
| - High intensity mixing | | NO | NO | NO | YES | YES | YES | YES | YES | YES | YES |
| Extrusion compounding | | NO | NO | NO | YES | YES | YES | NO | YES | YES | YES |
| Injection molding | | YES | YES | YES | YES | YES | YES | YES | YES | YES | YES |

*Homopolymer - Hercules Pro Fax 6523
Copolymer 10% - Hercules Pro Fax 7523, nominally 10% ethylene
Copolymer 20% - Hercules Pro Fax 8523, nominally 20% ethylene
**Also requires 80% through 325 mesh

TABLE II

| | | PHYSICAL PROPERTIES* | | | | | | | | | |
|---|---|---|---|---|---|---|---|---|---|---|---|
| | | Formulation Code | | | | | | | | | |
| Properties - | Units | #1 | #2 | #3 | #4 | #5 | #6 | #7 | #8 | #9 | #10 |
| TENSILE STRENGTH - | psi | | | | | | | | | | |

TABLE II-continued

PHYSICAL PROPERTIES*

| Properties - | Units | #1 | #2 | #3 | #4 | #5 | #6 | #7 | #8 | #9 | #10 |
|---|---|---|---|---|---|---|---|---|---|---|---|
| ASTM-D638 | | 5,000 | 4,000 | 3,000 | 4,000 | 4,400 | 4,000 | 3,000 | 3,200 | 2,500 | 3,300 |
| FLEXURAL MODULUS - | psi | | | | | | | | | | |
| ASTM-D790 | | 220,000 | 150,000 | 110,000 | 440,000 | 385,000 | 400,000 | 232,000 | 290,000 | 256,000 | 375,000 |
| IZOD IMPACT - | ft.lb/inch | | | | | | | | | | |
| ASTM-D256 - | notched | .9 | 2.0 | 3.5 | .6 | .4 | .8 | 1.0 | 1.0 | 1.3 | 1.3 |
| | unnotched | 16.0 | 25.0 | NB** | 22.7 | 3.3 | 24.0 | NB | NB | NB | 27.0 |
| DROP WEIGHT IMPACT- | in.lb | | | | | | | | | | |
| Gardner + 72° F | | 17 | 120 | — | — | — | 50 | — | — | — | 120 |
| − 20° F | | 2 | 56 | — | — | — | 10 | — | — | — | 32 |
| HEAT DEFLECTION TEMP - | ° F | | | | | | | | | | |
| ASTM-D648 | 66 psi | 212 | 180 | 167 | 240 | 260 | 250 | 217 | 213 | 230 | 242 |
| | 264 psi | 140 | 130 | 122 | 148 | 170 | 170 | 147 | 146 | 157 | |

*Specimens injection molded from a 400 – 450° F melt into 120° F ASTM specimen molds
**NB = No clean break at 30.0 ft. lbs. or over

What is claimed is:

1. A method for increasing impact strength of calcium carbonate filled propylene resin composites which comprises (A) admixing with high intensity rotary blade mixing (1) propylene resins which pass through a 20 mesh screen but are retained on a 325 mesh screen with (2) calcium carbonate filler which passes through a 60 mesh screen and at least 80% by weight passes through a 325 mesh screen to form a uniformly or substantially uniformly mixed powdery blend at a weight ratio of (2):(1) being about 7:13–9:11, the calcium carbonate filler having a number average particle diameter greater than 10 millimicrons, wherein the propylene resins comprise propylene homopolymer and copolymer and (B) fusing the uniformly or substantially uniformly mixed powdery blend which consists essentially of the particles of the filler and the particles of the resin to form the high impact composites.

2. A method according to claim 1 wherein the weight ration of propylene homopolymer to copolymer resin is about 1:2–2:1.

* * * * *